United States Patent Office 3,095,456
Patented June 25, 1963

3,095,456
NITROSULFIDES AND THEIR CORRESPONDING SULFONES
Edward B. Hodge, Terre Haute, Ind., assignor to Commercial Solvents Corporation, New York, N.Y., a corporation of Maryland
No Drawing. Filed May 23, 1960, Ser. No. 30,783
17 Claims. (Cl. 260—607)

My invention relates to nitrosulfides and their corresponding sulfones, and more particularly it relates to nitrosulfides and their corresponding sulfones having the following general formula:

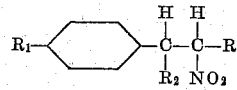

wherein R is lower alkyl or hydrogen; wherein $R_1$ is halo, hydrogen, alkyl, or alkoxyl; and $R_2$ is either the radical:

or the radical

wherein $R_3$ is phenyl, tolyl, xylyl, p-t-butylphenyl, or alkyl.

My new sulfides are prepared by reacting a nitroolefin having the following general formula:

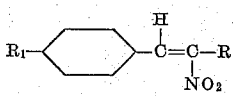

wherein R is lower alkyl or hydrogen and wherein $R_1$ is hydrogen, alkoxy, lower alkyl, or halo with a substituted mercaptan, the substituent being either an aryl radical, an alkyl substituted aryl radical, or an alkyl radical in the presence of catalytic amounts of triethylamine. The new sulfones of my invention are prepared by oxidizing the corresponding sulfide with hydrogen peroxide. Examples of my new compounds include 2-nitro-1-phenylethyl xylyl sulfide, 2-nitro-1-p-chlorophenylpropyl p-t-butylphenyl sulfide, 2-nitro-1-phenylpropyl tolyl sufide, 2-nitro-1-phenylpropyl phenyl sulfide, 2-nitro-1-phenylpropyl dodecyl sulfide, 2-nitro-1-p-methoxyphenylpropyl phenyl sulfide, 2-nitro-1-p-tolylpropyl butyl sulfide, their corresponding sulfones, etc., and the like.

Generally, in preparing my new sulfides, I add the mercaptan mixed with a small amount of triethylamine to the nitro-olefin at room temperature and allow the mixture to stand at said temperature until the product is formed. In producing my new sulfides, I employ the theoretical proportions of reactants i.e., 1 mole of nitro-olefin to 1 mole of mercaptan.

I can prepare the sulfones of my invention by oxidizing the corresponding sulfides. I prefer to form a mixture of the corresponding sulfide with a suitable solvent, for example, acetic acid and add to this mixture an aqueous hydrogen peroxide solution such as 30% hydrogen peroxide and then heat the mixture at a temperature of from about 50 to about 75° C. until the product is formed.

The nitro-olefins utilized in preparing the compounds of my invention can be prepared by condensing an aromatic aldehyde having the following general formula:

wherein $R_1$ is halo, alkoxy, alkyl or hydrogen with a nitroparaffin having the general formula:

wherein $R_5$ is alkyl or hydrogen in the presence of an alkylamine. Examples of nitro-olefins useful in producing the compounds of my invention include 1-p-chlodophenyl-2-nitro-1-propene, 1-phenyl-2-nitro-1-ethene, 1-p-chlorophenyl-2-nitro-1-pentene, 1-p-methoxyphenyl-2-nitro-1-propene, 1-p-tolyl-2-nitro-1-propene, etc., and the like. The examples of the mercaptans utilized in producing the compounds of my invention include t-butylthiophenol, thiocresol, thiophenol, dodecanethiol, butanethiol, thioxylenol, etc.

My new compositions are useful as preservatives for textiles. In utilizing my new compositions as preservatives for textiles, I apply on the textile a solution containing about 0.1% by weight based on the weight of the textile of one of my new compositions. Any suitable solvent for my new compositions such as acetone can be utilized.

The following examples are offered to illustrate my invention; however, I do not intend to be limited to the specific materials, proportions and procedures shown. Rather, I intend for all equivalents obvious to those skilled in the art to be included within the scope of my invention.

*Example I*

A 42-gram portion of t-butylthiophenol was slowly added to 1 ml. of triethylamine. This mixture was then slowly added to 49 grams of 1-p-chlorophenyl-2-nitro-1-propene. The resulting mixture was allowed to stand for about 48 hours. At the end of the 48-hour period, 90 grams of 2-nitro-1-p-chlorophenyl-propyl p-t-butylphenyl sulfide were recovered.

*Example II*

To 30 grams of the 2-nitro-1-p-chlorophenylpropyl p-t-butylphenyl sulfide produced in Example 1 were added 75 ml. of acetic acid. The resulting mixture was heated to 60° C. and 40 ml. of 30% hydrogen peroxide were added. The resulting mixture was heated on a steam bath for about 3 hours. At the end of the 3-hour period, 18.5 grams of white crystalline 2-nitro-1-p-chlorophenylpropyl p-t-butylphenyl sulfone were recovered.

*Example III*

A 50-gram portion of thiocresol was slowly added to 1 ml. of triethylamine. This mixture was then slowly added to 62 grams of 1-phenyl-2-nitro-1-propene. The resulting mixture was allowed to stand for about 48 hours. At the end of the 48-hour period, 85 grams of 2-nitro-1-phenylpropyl tolyl sulfide were recovered.

*Example IV*

To 30 grams of the 2-nitro-1-phenylpropyl tolyl sulfide produced in Example III were added 75 ml. of acetic acid. The resulting mixture was heated to 60° C. and 40 ml. of 30% hydrogen peroxide were added. The resulting mixture was heated on a steam bath for about 3 hours. At the end of the 3-hour period 17.9 grams of white crystalline 2-nitro-1-phenylpropyl tolyl sulfone were recovered.

*Example V*

A 50-gram portion of dodecanethiol was slowly added to 1 ml. of triethylamine. This mixture was slowly added to 55 grams of 1-phenyl-2-nitro-1-propene. The resulting mixture was allowed to stand for about 48 hours. At the end of the 48-hour period, 81 grams of 2-nitro-1-phenylpropyl dodecyl sulfide were recovered.

*Example VI*

To 30 grams of the 2-nitro-1-phenylpropyl dodecyl sulfide produced in Example I were added 75 ml. of acetic acid. The resulting mixture was heated to 60° C. and 40 ml. of 30% hydrogen peroxide were added. The resulting mixture was heated on a steam bath for about 3 hours. At the end of the 3-hour period 20.2 grams of white crystalline 2-nitro-1-phenylpropyl dodecyl sulfone were recovered.

*Example VII*

A 45-gram portion of thiophenol was slowly added to 1 ml. of triethylamine. This mixture was then slowly added to 48 grams of 1-p-methoxyphenyl-2-nitro-1-propene. The resulting mixture was allowed to stand for about 48 hours. At the end of the 48-hour period, 76 grams of 2-nitro-1-p-methoxyphenylpropyl phenyl sulfide were recovered.

*Example VIII*

To 30 grams of the 2-nitro-1-p-methoxyphenylpropyl phenyl sulfide produced in Example VII were added 75 ml. of acetic acid. The resulting mixture was heated to 60° C. and 40 ml. of 30% hydrogen peroxide were added. The resulting mixture was heated on a steam bath for about 3 hours. At the end of the 3-hour period, 16.6 grams of white crystalline 2-nitro-1-p-methoxyphenylpropyl phenyl sulfone were recovered.

*Example IX*

A 40-gram portion of butanethiol was slowly added to 1 ml. of triethylamine. This mixture was then slowly added to 52 grams of 1-p-tolyl-2-nitro-1-propene. The resulting mixture was allowed to stand for about 48 hours. At the end of the 48-hour period, 67 grams of 2-nitro-1-p-tolylpropyl butyl sulfide were recovered.

*Example X*

To 30 grams of the 2-nitro-1-p-tolylpropyl butyl sulfide produced in Example IX were added 75 ml. of acetic acid. The resulting mixture was heated to 60° C. and 40 ml. of 30% hydrogen peroxide were added. The resulting mixture was heated on a steam bath for about 3 hours. At the end of the 3-hour period, 15.8 grams of white crystalline 2-nitro-1-p-tolylpropyl butyl sulfone were recovered.

*Example XI*

A 40-gram portion of thioxylenol was slowly added to 1 ml. of triethylamine. This mixture was then slowly added to 50 grams of 1-phenyl-2-nitro-1-ethene. The resulting mixture was allowed to stand for about 48 hours. At the end of the 48-hour period 67 grams of 2-nitro-1-phenylethyl xylyl sulfide were recovered.

*Example XII*

To 30 grams of the 2-nitro-1-phenylethyl xylyl sulfide produced in Example XI were added 75 ml. of acetic acid. The resulting mixture was heated to 60° C. and 40 ml. of 30% hydrogen peroxide were added. The resulting mixture was heated on a steam bath for about 3 hours. At the end of the 3-hour period 17.6 grams of white crystalline 2-nitro-1-phenylethyl xylyl sulfone were recovered.

Now having described my invention, what I claim is:

1. Compositions of matter having the following general formula:

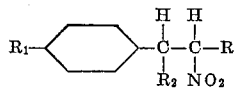

wherein R is a member selected from the group consisting of lower alkyl and hydrogen; wherein $R_1$ is a member selected from the group consisting of, halo, alkyl, and alkoxy; wherein $R_2$ is a member selected from the group consisting of the radical:

and the radical

wherein $R_3$ is a member selected from the group consisting of phenyl, tolyl, xylyl, p-t-butylphenyl, and alkyl.

2. Nitrosulfides having the following general formula:

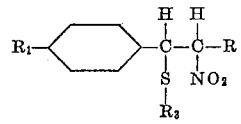

wherein R is a member selected from the group consisting of lower alkyl and hydrogen; wherein $R_1$ is a member selected from the group consisting of halo, alkyl, and alkoxy and $R_3$ is a member selected from the group consisting of phenyl, tolyl, xylyl, p-t-butylphenyl, and alkyl.

3. Nitrosulfones having the following general formula:

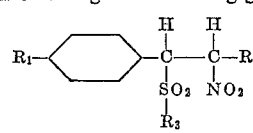

wherein R is a member selected from the group consisting of lower alkyl, and hydrogen; wherein $R_1$ is a member selected from the group consisting of hydrogen, halo, alkyl, and alkoxy, and $R_3$ is a member selected from the group consisting of phenyl, tolyl, xylyl, p-t-butylphenyl, and alkyl.

4. 2-nitro-1-p-chlorophenylpropyl p-t-butylphenylsulfide.
5. 2-nitro-1-p-chlorophenylpropyl p-t-butylphenyl sulfone.
6. 2-nitro-1-phenylpropyl tolyl sulfone.
7. 2-nitro-1-phenylpropyl dodecyl sulfone.
8. 2-nitro-1-p-tolylpropyl butyl sulfide.
9. 2-nitro-1-p-tolylpropyl butyl sulfone.
10. 2-nitro-1-p-methoxyphenylpropyl phenyl sulfide.
11. 2-nitro-1-p-methoxyphenylpropyl phenyl sulfone.
12. 2-nitro-1-phenylethyl xylyl sulfone.
13. A process for the production of nitrosulfides having the following general formula:

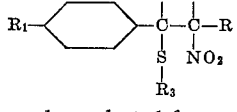

wherein R is a member selected from the group consisting of lower alkyl and hydrogen; wherein $R_1$ is a member selected from the group consisting of halo, alkyl, and alkoxy; and wherein $R_3$ is a member selected from the group consisting of phenyl, tolyl, xylyl, p-t-butylphenyl, and alkyl, which comprises interacting a nitro-olefin having the following general formula:

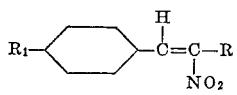

wherein R is a member selected from the group consisting of lower alkyl and hydrogen; and $R_1$ is a member selected from the group consisting of halo, alkoxy and alkyl with a mercaptan selected from the group consisting of alkyl substituted aryl mercaptans, aryl mercaptans, and alkyl mercapatns in the presence of catalytic amounts of a lower alkyl amine.

14. A process for the production of nitrosulfones having the following general formula:

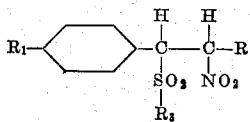

wherein R is a member selected from the group consisting of alkyl and hydrogen; wherein $R_1$ is a member selected from the group consisting of hydrogen, halo, alkoxy, and alkyl; and $R_3$ is a member selected from the group consisting of phenyl, xylyl, tolyl, p-t-butylphenyl, and alkyl, which comprises oxidizing a nitrosulfide having the following general formula:

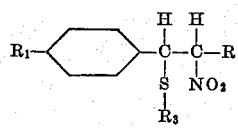

wherein R is a member selected from the group consisting of lower alkyl and hydrogen; $R_1$ is a member selected from the group consisting of hydrogen, halo, alkoxy, and alkyl; and $R_3$ is a member selected from the group consisting of phenyl, xylyl, tolyl, p-t-butylphenyl, and alkyl.

15. The process of claim 14 wherein the nitrosulfide is oxidized at a temperature from about 50 to 75° C.

16. The process of claim 15 wherein the nitrosulfide is oxidized with hydrogen peroxide.

17. A process for the production of nitrosulfones having the following general formula:

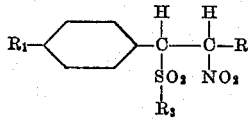

wherein R is a member selected from the group consisting of alkyl and hydrogen; wherein $R_1$ is a member selected from the group consisting of hydrogen, halo, alkoxy, and alkyl; and wherein $R_3$ is a member selected from the group consisting of phenyl, xylyl, tolyl, p-t-butylphenyl, and alkyl which comprises interacting a nitro-olefin having the following general formula:

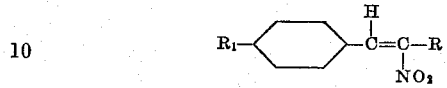

wherein R is a member selected from the group consisting of lower alkyl and hydrogen and $R_1$ is a member selected from the group consisting of halo, hydrogen, alkoxy, and alkyl with a mercaptan selected from the group consisting of alkyl substituted aryl mercaptans, aryl mercaptans, and alkyl mercaptans in the presence of catalytic amounts of a lower alkylamine to produce a nitrosulfide having the following general formula:

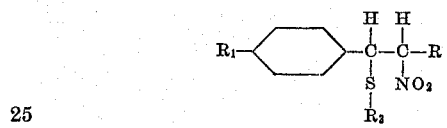

wherein R is a member selected from the group consisting of lower alkyl and hydrogen; $R_1$ is a member selected from the group consisting of hydrogen, halo, alkoxy, and alkyl; and $R_3$ is a member selected from the group consisting of phenyl, xylyl, tolyl, p-t-butylphenyl, and alkyl and oxidizing the thus produced nitrosulfide.

References Cited in the file of this patent

UNITED STATES PATENTS 2,511,961   Bahner _____ June 20, 1950